US008611443B2

(12) United States Patent
Bury (10) Patent No.: US 8,611,443 B2
(45) Date of Patent: Dec. 17, 2013

(54) METHOD AND APPARATUS TO CANCEL ADDITIVE SINUSOIDAL DISTURBANCES IN OFDM RECEIVERS

(75) Inventor: Andreas Bury, Dresden (DE)

(73) Assignee: NXP, B.V., Eindhoven (NL)

( * ) Notice: Subject to any disclaimer, the term of this patent is extended or adjusted under 35 U.S.C. 154(b) by 392 days.

(21) Appl. No.: 12/863,543

(22) PCT Filed: Jan. 15, 2009

(86) PCT No.: PCT/IB2009/050150
§ 371 (c)(1),
(2), (4) Date: Jul. 19, 2010

(87) PCT Pub. No.: WO2009/093156
PCT Pub. Date: Jul. 30, 2009

(65) Prior Publication Data
US 2010/0296568 A1    Nov. 25, 2010

(30) Foreign Application Priority Data

Jan. 25, 2008   (EP) .................................... 08100957
Apr. 30, 2008   (EP) .................................... 08103777

(51) Int. Cl.
*H04L 27/28*         (2006.01)
(52) U.S. Cl.
USPC ........... 375/260; 375/259; 375/227; 375/346; 375/347; 375/348; 375/349
(58) Field of Classification Search
USPC .......... 375/260, 259, 227, 346, 347, 348, 349
See application file for complete search history.

(56) References Cited

U.S. PATENT DOCUMENTS

| 5,410,750 | A | | 4/1995 | Cantwell et al. | |
| 6,052,421 | A | * | 4/2000 | Richardson et al. | 375/346 |
| 2004/0218520 | A1 | * | 11/2004 | Aizawa | 370/203 |
| 2008/0273615 | A1 | * | 11/2008 | Song et al. | 375/260 |
| 2010/0322364 | A1 | * | 12/2010 | Bogdan | 375/350 |

FOREIGN PATENT DOCUMENTS

| CN | 1310894 A | 8/2001 |
| CN | 1937429 A | 3/2007 |
| EP | 1 349 337 A2 | 10/2003 |

(Continued)

OTHER PUBLICATIONS

Weinstein, S. B., et al; "Data Transmission by Frequency-Division Multiplexing Using the Discrete Fourier Transform," IEEE Trans. Communication Technology, COM-19(5), pp. 628-634 (Oct. 1971).

*Primary Examiner* — Kenneth Lam (57) ABSTRACT

Orthogonal frequency division multiplexing (OFDM) has become a popular transmission method for high speed wireless radio transmission, due to its potential for low complexity of transmitters and receivers. A method and apparatus are contemplated for cancelling additive sinusoidal disturbances of a known frequency in OFDM receivers which arise e.g. from clock signals that are present for frequency reference, mixer control, and A/D converter control, as well as harmonics and mixing products of those periodic signals, coupling into some point in the receiver chain and appearing as rotating complex exponentials superimposed to complex baseband receive signals. According to the inventive method and apparatus an estimation of an amplitude and phase of a disturbing superimposed tone with a known frequency is obtained and the amplitude and phase estimation is used to cancel the spurious tone preventing a degradation of receiver sensitivity while achieving low implementation complexity.

15 Claims, 4 Drawing Sheets

(56) References Cited

FOREIGN PATENT DOCUMENTS

| | | |
|---|---|---|
| JP | 2000-165343 A | 6/2000 |
| JP | 2004-140739 A | 5/2004 |
| JP | 2004-328440 A | 11/2004 |
| WO | 00/11823 A1 | 3/2000 |
| WO | 00/19598 A1 | 4/2000 |
| WO | 2004/114617 A1 | 12/2004 |

* cited by examiner

METHOD AND APPARATUS TO CANCEL ADDITIVE SINUSOIDAL DISTURBANCES IN OFDM RECEIVERS

The present invention relates to a method and an apparatus to cancel additive sinusoidal disturbances of a known frequency in OFDM receivers.

BACKGROUND OF THE INVENTION

Orthogonal frequency division multiplexing (OFDM) has become a popular transmission method for high-speed wireless radio transmission, due to its potential for low complexity of transmitters and receivers, paired with robustness under severe multi-path conditions. A more detailed discussion on OFDM in found in S. B. Weinstein and P. M. Ebert: Data transmission by frequency-division multiplexing using the discrete Fourier transform. IEEE Trans. Communication Technology, COM-19(5):628-634, October 1971. The wired counterpart, known as discrete multi-tone (DMT) employs similar techniques. The transmitter uses an inverse discrete Fourier transform (IDFT) to generate a multi-carrier signal, and the receiver applies the Discrete Fourier Transform (DFT) to demodulate the data.

Integrated radio receivers need a large gain and a low noise figure to achieve a high sensitivity. Clock signals which are present for frequency reference, mixer control, and A/D converter control, as well as harmonics and mixing products of these periodic signals, may couple into some point in the receiver chain and appear as rotating complex exponentials superimposed to the complex baseband receive signal. If the level of such tones becomes too high, they may degrade the receiver sensitivity. The frequencies of such disturbing tones originating from the RF receiver itself are directly related to the clock frequencies occurring in the receiver.

As stated above, unwanted tones superimposed to the received signal may reduce the receiver sensitivity. The safest approach to prevent this problem is to directly avoid the occurrence of such tones. Even the coupling mechanism may be known and a re-spin of the receiver design may be able to reduce the coupling. However, in highly integrated receiver systems the effort to achieve this can be quite high, possibly requiring detailed modelling, design modifications and additional verification.

A general object of the present invention, therefore, is to mitigate such additive disturbing tones in an OFDM baseband receiver, while achieving low implementation complexity.

SUMMARY OF THE INVENTION

According to an aspect of the present invention there is provided a method for cancelling additive sinusoidal disturbances in OFDM receivers. According to a further aspect of the present invention there is provided an apparatus. The inventive method and apparatus obtain an estimation of an amplitude and phase of a disturbing superimposed tone, whose frequency is known, and use such amplitude and phase estimation values to cancel the tone such that receiver sensitivity degradation is avoided.

In accordance with the invention the implementation is made in a way to achieve a low complexity, which translates into low overhead power consumption in applying the method.

Additional features and advantages of the present invention will be apparent from the following detailed description of specific embodiments which is given by way of example and in which reference will be made to the accompanying drawings, wherein:

DETAILED DESCRIPTION

Figure 1:
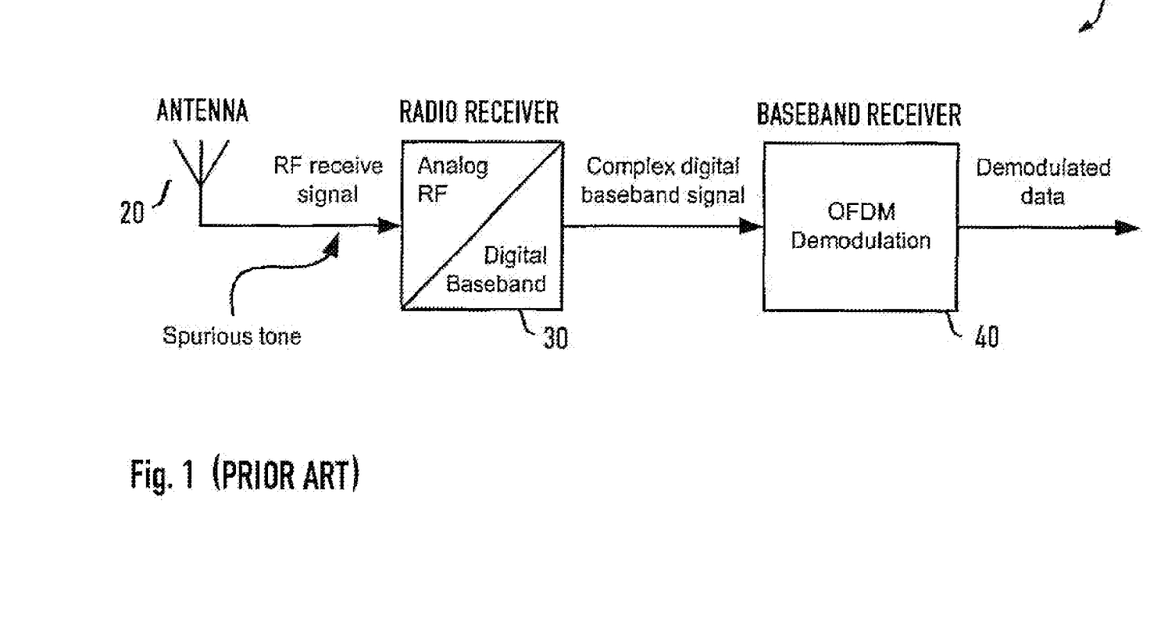
FIG. 1 is a schematic block diagram of an OFDM receiver, in which the present invention may be implemented.

FIG. 1 shows a schematic block diagram of an OFDM receiver 1 in which the present invention may be implemented. An analog OFDM radio signal is received via an antenna 20 and is fed into a radio receiver 30 where it is converted to a digital complex baseband signal. Typically, radio receiver 30 consists of a low noise amplifier, a mixer which is controlled by a local oscillator, a band selection filter, further amplifier stages and optionally a second mixer, an analog-to-digital converter, and a digital decimation filter. Radio receiver 30 outputs a digital complex baseband signal. This signal is fed into a digital OFDM baseband demodulator 40, from where demodulated data are output.

Figure 2:
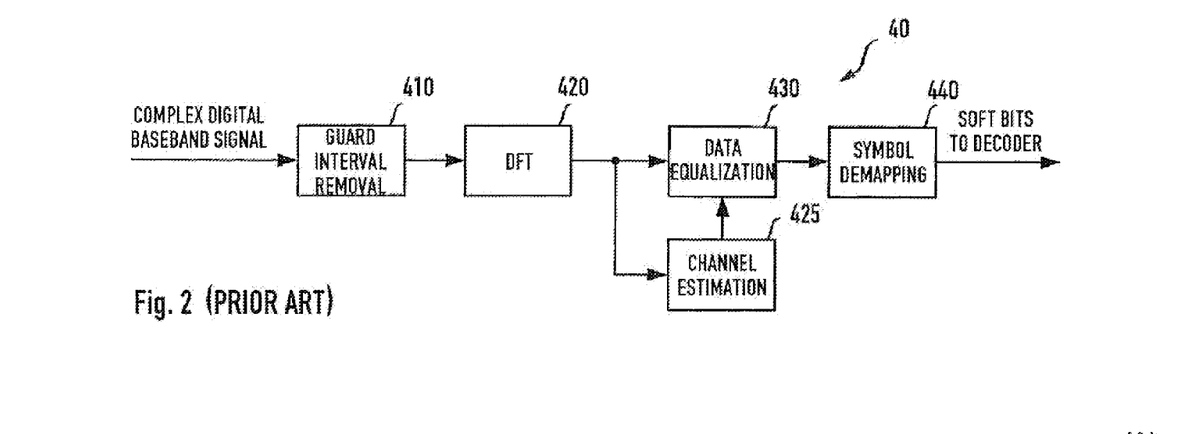
FIG. 2 is a block diagram of a typical known OFDM demodulator.

FIG. 2 is a block diagram of a typical OFDM demodulator 40 as shown in FIG. 1, as it is known from the prior art. The input signal which is a digital complex baseband signal supplied from radio receiver 30 of FIG. 1 is fed to a guard interval removal unit 410 where it is cut into blocks of samples of a length corresponding to the OFDM symbol period. Then, the guard period of each such sample block is removed, and a Discrete Fourier Transform (DFT) is performed on each remainder of the sample blocks in a Discrete Fourier Transform unit 420. DFT unit 420 outputs data comprised of symbols which are received on respective OFDM sub-carriers in a data equalization unit 430. Optionally, channel estimation for all sub-carriers of interest is performed in a channel estimation unit 425 prior of being fed into data equalization unit 430. After equalization the sub-carrier symbols are fed from data equalization unit 430 to a symbol demapper 440 which outputs soft bits to be fed to a decoder. Discrete Fourier Transform in DFT unit 420 is typically implemented as a Fast Fourier Transform (FFT). This kind of OFDM demodulator is well known in prior art. However, it has the drawback that it is not robust against sinusoidal disturbances which typically occur by coupling of periodic voltages or currents into the RF signal path. Such sinusoidal disturbances appear at the input of OFDM baseband receiver 40 as superimposed complex rotating exponentials. Depending on the level and frequency of such disturbances, a large number of information symbols may be corrupted. This degrades the sensitivity of the receiver.

Figure 3:
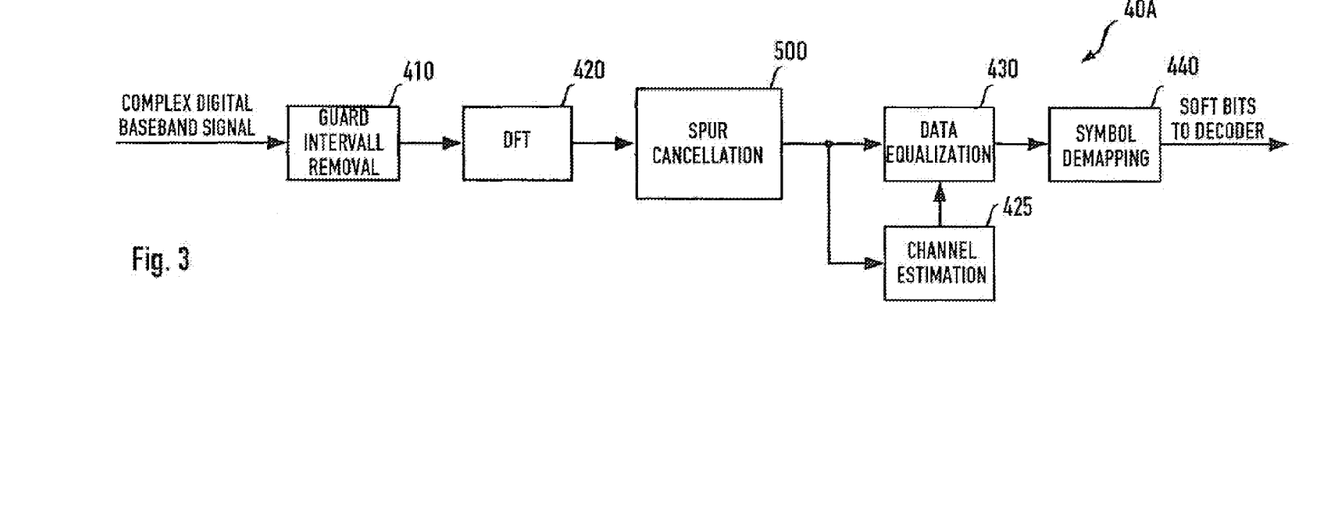
FIG. 3 shows a block diagram of an OFDM baseband receiver according to a preferred embodiment of the present invention.

FIG. 3 shows a OFDM baseband receiver 40A modified according to the invention. OFDM baseband receiver 40A is similar to OFDM baseband receiver 40 of FIG. 2 described above except that it additionally includes a spur cancellation unit 500 right behind DFT unit 420. The function of this spur cancellation unit 500 is to estimate both an amplitude and a phase of a superimposed rotating exponential of known frequency which is present at the input of DFT unit 420, and to eliminate this disturbance. Such tones of known frequency typically originate from harmonics and potential mixing products of periodic signals occurring in the RF front-end. The frequencies of those signals are in a constant ratio with the frequency of the reference clock which is normally used for both the RF front-end and the digital baseband receiver.

Before referring to FIG. 4 which illustrates spur cancellation unit 500 in greater detail, some mathematical basis of the functionality of spur cancellation unit 500 will be delineated, first, for the sake of understanding of the operation thereof, as follows. We make the following definitions:

$f_T$ is the frequency of the disturbing tone, normalized to the sampling frequency;

$N_{DFT}$ is the length of the discrete Fourier transform in samples;

$N_{Guard}$ is the length of the guard interval in samples;

$N_{Sym} = N_{DFT} + N_{Guard}$ is the number of time-domain samples per OFDM symbol;

k is the sampling time index;

y(k)=r(k)+z(k) is the complex baseband receive signal input into OFDM demodulator 40; with r(k) being the actual receive signal including other disturbances like noise; and $z(k) = A_T \cdot \exp(j2\pi \cdot f_T \cdot k + \phi_T)$ being the disturbing superimposed complex exponential; with $f_T$ being the known frequency, and $A_T$ and $\phi_T$ being amplitude and phase, respectively, of the disturbing complex exponential, which are to be estimated. Assuming that $0 \leq f_T < 1$, the periodic spectrum of a digital signal allows to map any possible tone onto this range.

Transformation of a complex exponential $z(k) | 0 \leq k < N_{DFT}$ via DFT yields the values $$Z(n) = A_T \cdot \exp(j \cdot \varphi_T) \cdot \sum_{k=0}^{N_{DFT}-1} \exp\left(j2\pi \cdot k \cdot \left(f_T - \frac{n}{N_{DFT}}\right)\right),$$

where n denotes the element index in the resulting vector.

Rewriting this equation as $Z(n) = [A_T \cdot \exp(j \cdot \phi_T)/N_{DFT}] \cdot W(n)$ splits it into the amplitude/phase factor $(A_T \cdot \exp(j \cdot \phi_T)/N_{DFT})$ and the weighting pattern $$W(n) = \frac{1}{N_{DFT}} \cdot \sum_{k=0}^{N_{DFT}-1} \exp\left(j2\pi \cdot k \cdot \left(f_T - \frac{n}{N_{DFT}}\right)\right),$$

which is only determined by the frequency of the disturbing tone (when treating $N_{DFT}$ as given). We assume that the frequency of the disturbing tone is known, and we need to estimate the amplitude and the phase of the tone.

Now consider the receive signal after DFT, which ideally consists only of a superposition of data symbols disturbed by the channel fading and additive noise. Let y(k) $|K \cdot N_{Sym} \leq k < K \cdot N_{Sym} + N_{DFT}$ denote the DFT input samples of OFDM symbol number K and $Y_K(n)$ denote the associated DFT output vector, with $0 \leq n < N_{DFT}$.

If no additive complex exponential is present, we assume that the output of all OFDM sub-carriers during reception is a zero-mean random process, i.e., $E\{Y_K(n)\} = 0 \forall K, n.$ Furthermore we assume that distinct DFT output symbols are statistically independent, i.e., $E\{Y_{K_1}(n_1) \cdot Y_{K_2}(n_2)\} = 0 \forall K_1 \neq K_2 \vee n_1 \neq n_2$ Three key ideas are applied for estimation of a superimposed disturbing complex exponential:

1. The scalar product of the DFT output vector $Y_K(n)$ with the pattern $W(n|f_T)$, $$P_K = \sum_{n=0}^{N_{DFT}-1} Y_K(n) \cdot W^*(n)$$

is the projection of the DFT output vector into the direction of the tone and is an estimate of the amplitude and phase factor $(A_T \cdot \exp(j \cdot \phi_T)/N_{DFT})$ multiplied with a phase offset term $\exp(j2\pi \cdot f_T \cdot K \cdot N_{Sym})$ which is the start of phase of the complex exponential at the beginning of OFDM symbol number K. Hence, with the assumptions made the expectation of the above scalar product is $E\{P_K\} = A_T \cdot \exp(j \cdot \phi_T)/N_{DFT} \cdot \exp(j2\pi \cdot f_T \cdot K \cdot N_{Sym})$.

2. A back-rotation of the scalar product by the start phase yields $Q_K = P_K \cdot \exp(-j2\pi \cdot f_T \cdot K \cdot N_{Sym})$ which is an estimate of the amplitude and phase with $E\{Q_K\} = A_T \cdot \exp(j \cdot \phi_T)/N_{DFT}$ 3. Averaging of multiple such back-rotated estimates $Q_K$ reduces the estimation error.

Figure 4:
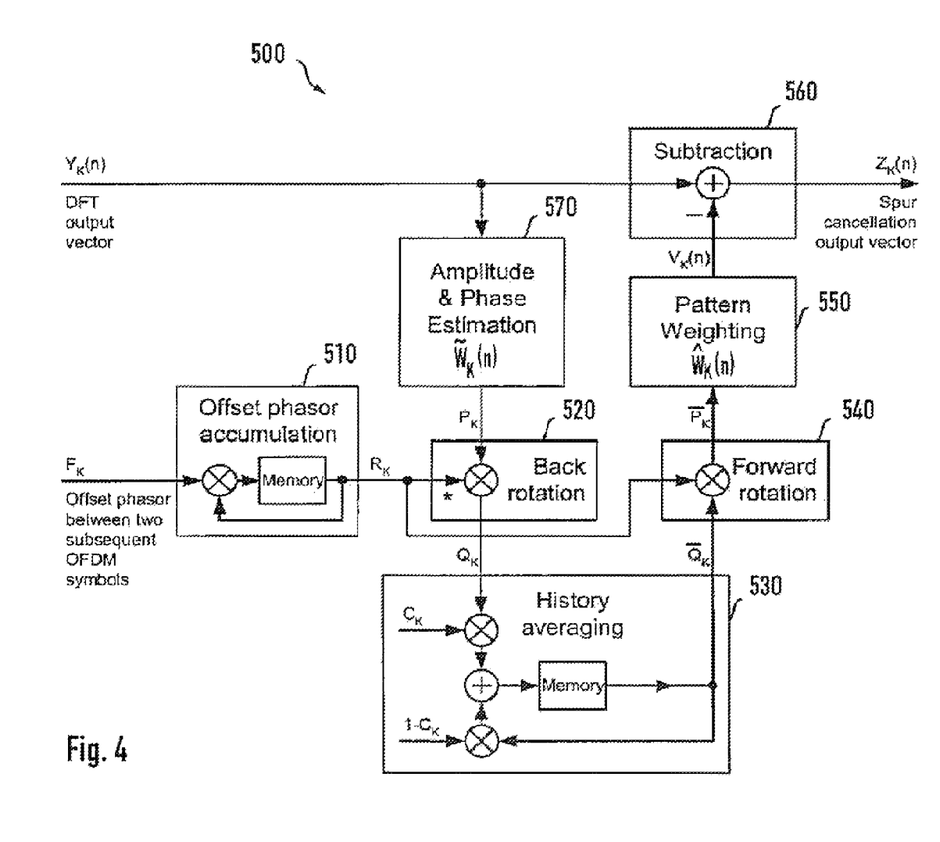
FIG. 4 is a block diagram illustrating in more detail a preferred embodiment of the spur cancellation unit of FIG. 3 according to the present invention.

FIG. 4 illustrates in more detail a first preferred embodiment of spur cancellation unit of FIG. 3 according to the invention for cancelling a disturbing complex exponential in an OFDM receiver employing the principles described above.

An offset phasor $F_K = \exp(j2\pi \cdot f_T \cdot N_{Sym})$, here with the constant $F_K = F \forall K$ is input to an offset phasor accumulation unit 510 and is cumulatively multiplied to obtain a sequence of start phasors $$R_K = \prod_{k=-\infty}^{K} F = \exp(j2\pi \cdot f_T \cdot K \cdot N_{Sym} + \vartheta_0).$$

$R_K$ is fed into a back rotation unit 520 where the complex conjugates of these values are multiplied with the amplitude/phase estimator output values $$P_K = \sum_{n=0}^{N_{DFT}-1} Y_K(n) \cdot \tilde{W}_K^*(n)$$

from an amplitude and phase estimation unit 570.

Here $\tilde{W}_K(n)$ is the estimation pattern, which equals W(n) in a first embodiment of the invention, which may however be simplified in another embodiment, as explained below. Furthermore, the estimation pattern may vary from OFDM symbol to OFDM symbol, which is denoted by the index K.

The obtained back-rotated amplitude/phase estimates $Q_K = R_K \cdot P^*_K$ are fed into an Infinite Impulse Response (IIR) linear low-pass filter 530 with a DC gain of one ("History averaging"), controlled by the factors $c_K$ with $0 < c_K < 1$. In a first embodiment of the invention, the factors $c_K$ are constant over time, irrespective of K.

The output values $\overline{Q}_K$ of filter 530 are then supplied to a forward rotation unit 540 and are forward rotated to obtain the estimated amplitude and phase for the current OFDM symbol, $\overline{P}_K = \overline{Q}_K \cdot \overline{R}_K$. The filter output value $\overline{Q}_K$ is obtained after a filter memory, because the estimate applied for cancellation in the current OFDM symbol should be based upon only previous OFDM symbols, thus exploiting statistical independency.

The output value $\overline{P}_K$ of forward rotation unit 540 is then supplied to a pattern weighting unit 550 and is weighted by a cancellation pattern $\hat{W}_K(n)$, which is, in a first embodiment of the invention, equal to $W(n)$, but which may be simplified in another embodiment, as will be explained below. Further, the cancellation pattern may vary from OFDM symbol to OFDM symbol which is denoted by the index K. Finally, the obtained vector $V_K(n)$ from pattern weighting unit 550 is fed into a subtractor 560 and is subtracted from vector $Y_K(n)$ output by DFT unit 420 of FIG. 4 to obtain an output vector after spur cancellation, $$Z_K(n) = Y_K(n) - V_K(n).$$

In another embodiment of the invention the condition $E\{Y_K(n)\} = 0$ may not be satisfied for some pairs (K,n), which is the case if pilot tones are included in the OFDM signal. To prevent the amplitude/phase estimate from becoming biased, the concerned pairs (K,n) shall not be considered in the estimator.

Figure 5:
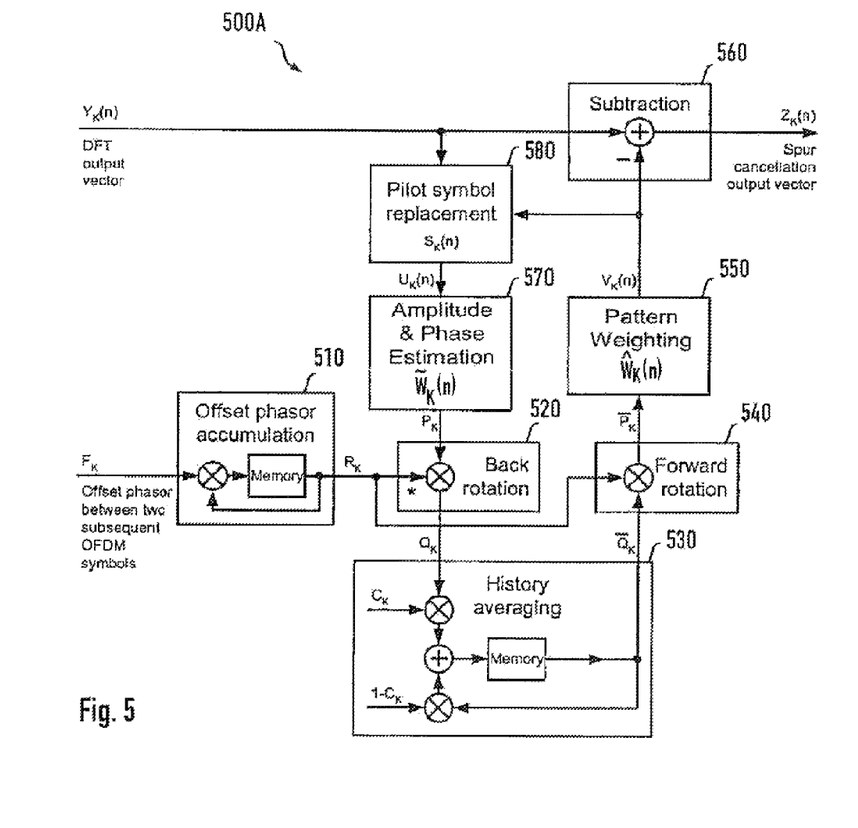
FIG. 5 is a block diagram showing another preferred embodiment of the spur cancellation unit of FIG. 3 according to the present invention.

This is achieved by a modified arrangement shown in FIG. 5 that illustrates an extension of the spurious tone cancellation arrangement of FIG. 4. The components in FIG. 5 which are the same or equivalent to components of FIG. 4 described above are designated with the same reference numerals, and a description thereof should not be repeated, for sake of brevity.

In the arrangement of FIG. 5, the output vectors from DFT unit 420 of FIG. 3 are first fed into a pilot symbol replacement unit 580. In pilot symbol replacement unit 580 all DFT output values, which shall not be considered in the estimation, are overwritten with the currently available estimate for the respective DFT bin. This is achieved by defining a pattern $S_K(n)$ which indicates at what positions the DFT output values shall not be considered for the estimation. The values of this pattern are defined as 0 where the DFT output shall be considered for spur estimation, and otherwise as 1.

Thus, the functionality of pilot symbol replacement unit 580 may be described by the equation $$U_K(n) = \begin{cases} Y_K(n) & \forall (K, n) \mid S_K(n) = 0 \\ V_K(n) & \text{otherwise.} \end{cases}$$

Another embodiment of the invention exploits a degree of freedom in the choice of the pattern $W(n)$, which is to rotate the phase of the entire vector in the complex plane, in order to obtain real-valued coefficients $W(n)$, which reduces the computational complexity. This can also be achieved using the equation $$W(n) = \frac{1}{N_{DFT}} \cdot \sum_{k=0}^{N_{DFT}-1} \exp\left(j2\pi \cdot \left(\left(k - \frac{N_{DFT}}{2}\right) \cdot f_T - \frac{k \cdot n}{N_{DFT}}\right)\right).$$

In still another embodiment of the invention the complexity of the amplitude/phase estimator 570 is reduced by exploiting the fact that most of the energy of the disturbing rotating exponential of known frequency is concentrated on a few bins at the DFT output. In this embodiment only a subset of DFT output bins, indexed by the set $$N_{Est} = \{n_1, n_2, \ldots, n_{N_{Est}}\} \subseteq \{0, 1, \ldots, N_{DFT}-1\}$$

is used, and the estimation pattern is determined by $$\tilde{W}_K(n) = \begin{cases} \dfrac{W_K(n)}{\sum_{n \in N_{Est}} |W_K(n)|^2} & \forall n \in N_{Est} \\ 0 & \text{otherwise.} \end{cases}$$

Here, the subscript K indicates that $W(n)$ may vary from OFDM symbol to OFDM symbol. The set $N_{Est}$ is typically defined such as to collect most of the energy with a limited number of bins, which is achieved by using only the coefficients with the largest absolute values in $W(n)$. In an extreme case, only a single value out of $W(n)$ is used.

In still another embodiment of the invention the complexity of the pattern weighting/spur subtraction units, 550 and 560, respectively, is reduced by exploiting the fact that most of the energy of the disturbing rotating exponential of known frequency is concentrated on a few bins at the DFT output, eliminating the need to subtract negligibly small disturbances. In this embodiment, only a subset of DFT output bins indexed by a set $$N_{Cancel} = \{n_1, n_2, \ldots, n_{N_{Cancel}}\} \subseteq \{0, 1, \ldots, N_{DFT}-1\}$$

is used, and the cancellation pattern is defined as $$\hat{W}_K(n) = \begin{cases} W_K(n) & \forall n \in N_{Cancel} \\ 0 & \text{otherwise.} \end{cases}$$

Again the subscript K indicates that $W(n)$ may vary from OFDM symbol to OFDM symbol. The set $N_{Cancel}$ is typically defined to apply to all elements in $W(n)$ where an unacceptable excessive disturbance is expected to occur. In an extreme case, only a single value out of $W(n)$ is addressed.

In another embodiment of the invention, a fast ring-in of the history averaging low-pass is realized by time-variation of the filter coefficients $c_K$. For example, when the first amplitude/phase estimate is performed at OFDM symbol with K=1, a good choice of a sequence is $$c_K = \begin{cases} 0 & K < 1 \\ 1/K & 1 \leq K < K_{Limit} \\ 1/K_{Limit} & K \geq K_{Limit}. \end{cases}$$

This results in an equal weighting of all incoming samples until the history averaging low-pass has rung in. After ring-in, weighting of filtered samples decays exponentially over time.

In another embodiment of the invention, each vector of samples subjected to DFT is first cyclically shifted before the DFT is processed, due to the OFDM receiver design. For a cyclic shift by $N_{Shift}$ samples, the weighting pattern becomes $$W(n) = \frac{1}{N_{DFT}} \cdot \sum_{k=0}^{N_{DFT}-1} \exp\left(j2\pi \cdot \left(((k - N_{Shift}) \bmod N_{DFT}) \cdot f_T - \frac{k \cdot n}{N_{DFT}}\right)\right).$$

All other principles of the invention are applied as described before.

In another embodiment of the invention the frequency of the disturbing tone changes over time, possibly due to some adaptation of the mixer frequency in the radio front-end. To cope with this, the offset phasor $F_K$ as well as the estimation pattern $\tilde{W}_K(n)$ and the cancellation pattern $\hat{W}_K(n)$ are adapted accordingly.

In another embodiment of the invention, where multiple disturbing sinusoids shall be cancelled, a plurality of spur cancellers, as described above, may be implemented. In this case all amplitude/phase estimations are performed in parallel on the DFT output data, whereas the subtractions of the estimated tones occur sequentially, tone by tone.

As an example, consider a DVB-H receiver implementation with $N_{DFT}$=4096, $N_{Guard}$=1024, $N_{Sym}$=5120, $N_{Shift}$=512, with a sampling frequency $f_{sample}$=48/7 MHz, which is disturbed by a spurious tone at a frequency $f_{Spur}$=1 MHz. The normalized frequency of the tone is $f_T$=$f_{Spur}/f_{Sample}$=7/48. The tone frequency corresponds with the OFDM sub-carrier index $n_T$=$f_T \cdot N_{DFT}$=597⅓. The offset phasor is determined as $$F_K = \exp\left(j2\pi \cdot \frac{7}{48} \cdot 5120\right) = -\frac{1}{2} - j\frac{\sqrt{3}}{2}.$$

The estimation pattern is defined as $$\tilde{W}_K(n) = \begin{cases} \frac{2\pi}{3\sqrt{3}} & \text{for } n = 597 \\ 0 & \text{otherwise,} \end{cases}$$

the cancellation pattern is defined as $$\hat{W}_K(n) = \begin{cases} \frac{1}{4096} \cdot \sum_{k=0}^{4095} \exp\left(j2\pi \cdot \left(((k-512)\bmod 4096) \cdot f_T - \frac{k \cdot n}{4096}\right)\right) & \text{for } 591 \leq n \leq 603 \\ 0 & \text{otherwise,} \end{cases}$$

and the minimum filter constant after ring-in is set to $$C_{K,min} = \frac{1}{10}.$$

Applications of the Invention

The various embodiments of the invention as detailed above may be applied separately or in combination in an OFDM receiver for wireless or wired transmission including, but not limited to, receivers in wireless local area network (WLAN) applications, e.g., according to the IEEE 802.11 standard, in wireless personal area network (WPAN) applications, e.g., according to the IEEE 802.16 standard, in digital TV receivers for, e.g., DVB-T, DVB-H, T-DMB, DMB-T, DAB, in ultra-wideband (UWB) receivers according to the multi-band OFDM alliance (MBOA) standard proposal, etc.

The invention claimed is:

1. A method for cancelling additive sinusoidal disturbances in an Orthogonal Frequency-Division Multiplexing (OFDM) receiver, in which a digital complex baseband signal input is cut into blocks of samples, a guard period thereof is removed, a Discrete Fourier Transform (DFT) is performed on a remainder of each sample block, and data equalization and symbol demapping is performed to output soft bits to be fed to a decoder, wherein a frequency of a disturbance is known, the method comprising:

generating a test signal representing a disturbing signal of a known frequency that is presumed to occur in the OFDM receiver within a range of interest of a Radio Frequency (RF) received signal;

subjecting said generated test signal to DFT;

estimating, in a spur cancellation device with a subset of DFT output bins, an amplitude and a phase of said disturbing signal using said generated test signal to obtain amplitude and phase estimation values ($P_K$) by using only coefficients with largest absolute values for a weighting pattern; and eliminating said disturbing signal from the RF received signal using the obtained amplitude and phase estimation values.

2. The method of claim 1, wherein said estimating step comprises:

obtaining the amplitude and phase estimation values ($P_K$) by forming a scalar product of a current DFT output vector $Y_K(n)$ with an estimation pattern ($\hat{W}_K(n)$) which is only a function of a frequency of the disturbing signal.

3. The method of claim 1, wherein said estimating step comprises:

obtaining said amplitude and phase estimation values ($P_K$) by (i) forming a scalar product of a current DFT output vector $Y_K(n)$ with an estimation pattern ($\hat{W}_K(n)$) which is only a function of a frequency of the disturbing signal, and (ii) overwriting at least one DFT output value which contains a pilot tone with a currently available estimate ($V_K(n)$) for a respective DFT bin.

4. The method of claim 1, further comprising:

varying said estimation pattern from OFDM symbol to OFDM symbol.

5. The method of claim 1, wherein the eliminating step comprises:

cumulatively multiplying an offset phasor ($F_K$) between two subsequent OFDM symbols derived from the DFT;

obtaining a sequence of start phasors, wherein the start phasors have complex conjugates;

multiplying the complex conjugates of said start phasors with said amplitude and phase estimation values ($P_K$) to obtain back-rotated amplitude/phase estimates ($Q_K$);

obtaining an estimated amplitude and phase for a current OFDM symbol;

weighting said obtained estimated amplitude and phase by a cancellation pattern ($\hat{W}_K(n)$) to obtain a vector ($V_K(n)$); and subtracting the obtained vector ($V_K(n)$) from a DFT output vector to achieve spur cancellation.

6. The method of claim 5, further comprising:

varying said cancellation pattern from OFDM symbol to OFDM symbol.

7. The method of claim 5, wherein the step of obtaining an estimated amplitude and phase for a current OFDM symbol further comprises:

history averaging low-pass filtering said back-rotated amplitude/phase estimates ($Q_K$) under control of a filter coefficient $c_K$, with $0 < c_K < 1$.

8. The method of claim 7, wherein said filter coefficient $c_K$ is constant over time.

9. The method of claim 7, wherein said filter coefficient $c_K$ is variable over time.

10. The method of claim 5, further comprising:
if the frequency of the disturbing signal changes over time said offset phasor ($F_K$), adapting said estimation pattern ($W_K(n)$) and said cancellation pattern ($\hat{W}_K(n)$) accordingly.

11. The method of claim 1, further comprising:
cyclically shifting each vector of samples subjected to DFT before the DFT process.

12. The method of claim 1, further comprising:
if the method is effected for a plurality of disturbance signals of different frequencies, performing all amplitude/phase estimations in parallel on the DFT output data; and
performing the subtractions of the estimated signals sequentially, signal by signal.

13. The method of claim 1, further comprising:
selecting a single value from the coefficients with largest absolute values for the weighting pattern.

14. An arrangement for cancelling additive sinusoidal disturbances in Orthogonal Frequency-Division Multiplexing (OFDM) receivers, in which a digital complex baseband signal input is cut into blocks of samples, a guard period thereof is removed, a Discrete Fourier Transform (DFT) is performed on a remainder of each sample block, and data equalization and symbol demapping is performed to output soft bits to be fed to a decoder, wherein a frequency of a disturbing tone is known, the arrangement comprising:

an offset phasor accumulation device configured to cumulatively multiply an offset phasor ($F_K$) between two subsequent OFDM symbols derived from the performed DFT and obtain a sequence of start phasors, wherein the start phasors having complex conjugates;

an amplitude and phase estimation device configured to obtain amplitude and phase estimation values ($P_K$) by forming a scalar product of a current DFT output vector $Y_K(n)$ with an estimation pattern ($\hat{W}_K(n)$) which is only a function of the frequency of the disturbing tone;

a back rotation device configured to multiply the complex conjugates of said start phasors with the obtained amplitude and phase estimation values ($P_K$) to obtain back-rotated amplitude/phase estimates ($Q_K$);

a forward rotation device configured to obtain an estimated amplitude and phase for a current OFDM symbol;

a pattern weighting device configured to weight said obtained estimated amplitude and phase by a cancellation pattern ($\hat{W}_K(n)$) to obtain a vector ($V_K(n)$); and a subtractor device configured to subtract the obtained vector ($V_K(n)$) from a DFT output vector to achieve spur cancellation.

15. The arrangement of claim 14, further comprising:
a pilot symbol replacement device configured to overwrite at least one DFT output value which contains a pilot tone with a currently available estimate ($V_K(n)$) for a respective DFT bin.

* * * * *